(12) United States Patent
Muller-Frischinger

(10) Patent No.: US 8,003,737 B2
(45) Date of Patent: Aug. 23, 2011

(54) COATING SYSTEM

(75) Inventor: Isabelle Marie Muller-Frischinger, Riespach (FR)

(73) Assignee: Huntsman International LLC, The Woodlands, TX (US)

( * ) Notice: Subject to any disclaimer, the term of this patent is extended or adjusted under 35 U.S.C. 154(b) by 197 days.

(21) Appl. No.: 12/305,037

(22) PCT Filed: Jun. 14, 2007

(86) PCT No.: PCT/EP2007/055910
§ 371 (c)(1),
(2), (4) Date: Dec. 16, 2008

(87) PCT Pub. No.: WO2007/144408
PCT Pub. Date: Dec. 21, 2007

(65) Prior Publication Data
US 2010/0063181 A1    Mar. 11, 2010

(30) Foreign Application Priority Data

Jun. 16, 2006   (EP) .................................. 06115580

(51) Int. Cl.
| C08L 63/00 | (2006.01) |
| C08L 63/02 | (2006.01) |
| C08L 63/04 | (2006.01) |
| C08G 59/46 | (2006.01) |
| C08G 59/56 | (2006.01) |
| C08G 59/62 | (2006.01) |
| B32B 27/38 | (2006.01) |

(52) U.S. Cl. ........ 525/524; 523/427; 523/428; 523/455; 525/523; 525/534

(58) Field of Classification Search ........................ None
See application file for complete search history.

(56) References Cited

U.S. PATENT DOCUMENTS

| 5,312,878 A | * | 5/1994 | Shiobara et al. ............... 525/507 |
| 5,597,876 A | | 1/1997 | Murata et al. |
| 5,739,186 A | * | 4/1998 | Hayakawa et al. ........... 523/443 |
| 6,255,365 B1 | | 7/2001 | Hayakawa et al. |
| 6,649,729 B1 | | 11/2003 | Scherzer et al. |
| 2003/0219619 A1 | * | 11/2003 | Noro et al. ..................... 428/620 |
| 2004/0048971 A1 | | 3/2004 | Hayakawa et al. |

FOREIGN PATENT DOCUMENTS

WO   WO 2006067195 A1 *   6/2006

* cited by examiner

Primary Examiner — Michael J Feely

(57) ABSTRACT

A curable composition comprising
a) an epoxy resin containing on average more than one epoxy group per molecule, and
b) as curing agent a hybrid hardener, whereby said hardener is a blend of
b1) an aminic compound selected from aliphatic, cycloaliphatic, araliphatic amines, imidazoline group-containing amidoamines based on mono- or polybasic acids, adducts of said amines or amidoamines made from glycidyl compounds, adducts of said amines or amidoamines made from cyclic carbonates,
whereby said aminic compound contains, on average per molecule, at least two reactive hydrogen atoms bound to nitrogen atoms, and
b2) a DCPD-phenol based novolac, and wherein the DCPD-phenol novolac is used in an amount from 1 to 65 wt %, based on the total weight of the hardener blend b1) and b2), especially useful as protective coatings for metallic and mineral substrates.

11 Claims, No Drawings

COATING SYSTEM

CROSS REFERENCE TO RELATED APPLICATIONS

This application is the National Phase of International Application PCT/EP2007/055910 filed Jun. 14, 2007 which designated the U.S. and which claims priority to European Patent Application (EP) 06115580.0 filed June 16, 2006. The noted applications are incorporated herein by reference.

This invention relates to rapid setting coating systems which are based on epoxy resins and, as hardeners, blends of amines and dicyclopentadiene-phenol (DCPD-phenol) based novolacs, said systems are especially useful as protective coatings for metallic and mineral substrates.

Curable compositions which are based on glycidyl compounds and traditional polyamines or polyamidoamines are widely used for ambient-cure-temperature epoxy systems in adhesive and coating application fields like civil engineering, marine, architectural and maintenance.

However, amines having high reactivity and fast cure rates become more and more indispensable for certain applications which require a rapid return to service and/or a shorter manufacturing time. For instance, the manufacturing of ships or the relining of pipelines with rapid return to service are application areas, where the traditional epoxy/amine chemistry does, at the moment, not fulfill the requirements of rapid curing, especially at low temperatures. On the other hand with those compounds, which are commonly used to accelerate epoxy/amine systems—like tertiary amines, acids, hydroxylamines, and Mannich bases (described, for instance, in WO 00/015687)—it is not possible to achieve such fast curing properties at low temperatures.

In WO 99/29757 the use of polyphenol based novolacs as accelerators for amine/epoxy systems is described. However, with respect to certain polyamines, it has been observed that when using the given upper limit of 25 wt % of polyphenol novolac, it is not possible to reduce, for example the blushing and exudation when formulating them with standard epoxie. This leads to tacky surfaces and therefore to long times requiring dust free conditions, which are especially too long at low temperatures and further affect certain applications also requiring low temperature cure.

It has now surprisingly been found that coatings formed from a blend of dicyclopentadiene-phenol based novolacs with such amines exhibit much better dust free times if compared with coatings, which, while having an identical concentration of novolac in the amine blend, are however based on amine blends using the conventional phenol-formaldehyde novolacs.

Moreover, it was also observed that even at very high concentration levels of the DCPD-phenol based novolac of above 45 wt % dissolved in the amine led to hardener blends with acceptable viscosity ranges below 20 000 mPa·s when compared to blends made with standard phenol-formaldehyde novolac resins.

Therefore a first object of the invention are curable compositions comprising
a) an epoxy resin containing on average more than one epoxy group per molecule, and
b) as curing agent a hybrid hardener, whereby said hardener is a blend of
b1) an aminic compound selected from aliphatic, cycloaliphatic, araliphatic amines, imidazoline group-containing amidoamines based on mono- or polybasic acids, adducts of said amines or amidoamines made from glycidyl compounds, adducts of said amines or amidoamines made from cyclic carbonates,
whereby said aminic compound contains, on average per molecule, at least two reactive hydrogen atoms bound to nitrogen atoms, and
b2) a dicyclopentadiene-phenol (DCPD-phenol) based novolac, and wherein the DCPD-phenol novolac is used in an amount of from 1% to 65% by weight, based on the total weight of the hardener blend b1) and b2).

The compositions according to the present invention are used especially for providing protective coatings and adhesives in application fields like civil engineering, marine architectural and maintenance.

Suitable epoxy compounds, which are used according to this invention for the preparation of the curable compositions, are commercially available products which contain on average more than one epoxy group per molecule and which are saturated or unsaturated linear or branched aliphatic, cycloaliphatic, aromatic or heterocyclic. They may also bear substituents which do not materially interfere with the curing reaction.

Examples of epoxy resins suitable for use include those derived from mono- and/or poly-hydric and/or polynuclear phenols, especially bisphenols and novolacs. They are diglycidylether of bisphenol A, diglycidylether of bisphenol F and polyglycidyl ethers of polyhydric phenol obtained from the reaction of phenol (or alkylphenols) and aldehydes such as formaldehyde.

Polyglycidyl ethers of alcohols, glycols or polyglycols, and polyglycidyl esters of polycarboxylic acids can be used as well.

An extensive enumeration of epoxy compounds is to be found in the compendium "Epoxidverbindungen and Epoxidharze" by A. M. Paquin, Springer Verlag, Berlin, 1958, chapter IV, and in Lee & Neville, "Handbook of Epoxy Resins", 1967, chapter 2, pages 257-307.

It is also possible to use mixtures of two or more different epoxy compounds, which may have different multi epoxy functionality.

The epoxy compounds can be liquid, in particular liquid bisphenols or liquid novolacs. Also semi-solid or solid resins, especially those of type 1, can be used. Some commercially available solid resins of type 1 are available from Huntsman under the trade names Araldite® GT 7071 and GT 6071. In case of using semi-solid or solid resins a solvent is needed to dissolve the epoxy resin and to reduce the viscosity in such a way that the product can be sprayed, as it is the case in marine applications. Additionally also epoxy compounds derived from advancement reactions, for example the advancement of novolacs with bisphenol A could be used as well.

According to the invention, it is preferred to select compound a) from diglycidylether of bisphenol A, diglycidylether of bisphenol F, polyglycidylether of polyhydric phenol or cresol novolacs, mono- or polyglycidylether of mono- or polyhydric cycloaliphatic alcohols, mono- or polyglycidylether of mono- or polyhydric aliphatic alcohols.

Blends of epoxy resins with so-called reactive diluents, e.g. glycidyl ethers of: mono- or polyhydric phenols, mono- or polyhydric aliphatic alcohols, mono- or polyhydric cycloaliphatic alcohols, can be used as well. Some suitable examples are: cresylglycidyl ether, p-tert.-butyl-phenylglycidyl ether, n-dodecyl-/n-tetradecylglycidyl ether, 1,4-butanedioldyglycidyl ether, 1,6-hexanediol-diglycidyl ether, trimethylolpropanetriglycidyl ether, polyglycidyl ether like polyoxypropylenediglycidyl ether, cyclohexane-dimethanol-diglycidyl ether, glycidylester of neodecanoic acid and of cyclohexanedicarboxylic acid.

If necessary, the viscosity of the epoxy resins can be further reduced by adding such reactive diluents. However, such reactive diluents should only be used in reasonable amounts so that the diluents may not adversely affect the end-properties of the thermoset. The epoxy resins mentioned as examples can be used both for the curable compositions and for the preparation of the amine-epoxy adducts, that may be blended with the phenolic novolac resin.

In a preferred embodiment of the invention blends of the epoxy compound a) with reactive diluents are used, by pre-mixing the epoxy resin with at least one reactive diluent. Thus component a) is a mixture of an epoxy resin containing on average more than one epoxy group per molecule and a reactive diluent.

In another preferred embodiment of the invention, the component a) is premixed with a cyclic carbonate. Thus component a) is a mixture of an epoxy resin containing on average more than one epoxy group per molecule and a cyclic carbonate. It has the function to reduce significantly the viscosity of the formulation and therefore the system needs less solvent to be spray applicable. This is compliant with the environmental legislation on VOC's (VOC=volatile organic compound), which increasingly becomes strict and furthermore results in required high solid applications (low-VOC paints). The said cyclic carbonates could be added at different weight ratios but shoed not adversely affect the cure speed and the end properties of the thermosets. The cyclic carbonates and the epoxy resin can simply be mixed together. A suitable ratio between epoxy resin and carbonate in weight percent is from 75:25 to 99:1, preferably from 80:20 to 99:1, and most preferably from 85:15 to 99:1.

The aminic compounds b1), which are blended with the DCPD-phenol novolac resins and cured with the epoxy resins according to this invention, are aliphatic, cycloaliphatic, araliphatic amines, imidazoline group-containing amidoamines based on mono- or polybasic acids, adducts of said amines or amidoamines made from glycidyl compounds, adducts of said amines or amidoamines made from cyclic carbonates, whereby said aminic compound contains, on average per molecule, at least two reactive hydrogen atoms bound to nitrogen atoms.

These compounds are part of the general state of the art and are described, inter alia, in Lee & Neville, "Handbook of Epoxy Resins", MC Graw Hill Book Company, 1987, chapter 6-1 to 10-19.

Examples of aliphatic, cycloaliphatic or araliphatic amines used according to this invention are:
1,2-diaminoethane (ethylenediamine (EDA)); 1,2-propanediamine; 1,3-propanediamine; 1,4-diaminobutane; 2,2-dimethyl-1,3-propanediamine (neopentanediamine); diethylaminopropylamine (DEAPA); 2-methyl-1,5-diaminopentane; 1,3-diaminopentane; 2,2,4-Trimethyl-1,6-diaminohexane; 2,4,4-Trimethyl-1,6-diaminohexane and mixtures thereof (TMD); 1-amino-3-aminomethyl-3,5,5-trimethylcyclohexane; 1,3-bis(aminomethyl)-cyclohexane; 1,2-bis(aminomethyl)cyclohexane; hexamethylenediamine (HMD); 1,2- and 1,4-Diaminocyclohexane (1,2-DACH and 1,4-DACH); bis(4-aminocyclohexyl)methane; bis(4-amino-3-methylcyclohexyl)methane; diethylenetriamine (DETA); 4-azaheptane-1,7-diamine; 1,11-diamino-3,6,9-trioxundecane; 1,8-diamino-3,6-dioxaoctane; 1,5-diamino-methyl-3-azapentane; 1,10-diamino-4,7-dioxadecane; Bis(3-aminopropyl)amine; 1,13-diamino-4,7-10 trioxatridecane; 4-aminomethyl-1,8-diaminooctane; 2-butyl-2-ethyl-1,5-diaminopentane; N,N-Bis-(3-aminopropyl)methylamine; triethylenetetramine (TETA); tetraethylenepentamine (TEPA); pentaethylenehexamine (PEHA); Bis(4-amino-3-methylcyclohexyl)methane; m-xylylenediamine (MXDA); 5-(aminomethyl)bicyclo[[2.2.1]hept-2-yl]methylamine (NBDA norbornanediamine); dimethyldipropylenetriamine; dimethylaminopropyl-aminopropylamine (DMAPAPA); 3-aminomethyl-3,5,5-trimethylcyclohexylamine (or isophoronediamine (IPD)); diaminodicyclohexylmethane (PACM); mixed polycyclic amines (MPGA) (e.g. Ancamine 2168); dimethyldiaminodicyclohexylmethane (Laromin C260); 2,2-Bis(4-aminocyclohexyl)propane; bis aminomethyl-dicyclopentadiene (tricyclodecyldiamine (TCD)); imidazoline-group-containing polyaminoamides derived from aliphatic polyethylene polyamines and dimerized or trimerized fatty acids and adducts thereof made from glycidyl compounds.

Further, polyoxyalkylene polyamines, known as Jeffamine®, from Huntsman like D-230, D-400, D-2000, T-403, T-3000, T-5000, ED-600, ED-900, EDR148, and polyiminoalkylene polyamines, known as Polymin®, can be used, as well, to be blended with phenolic resins within the frame of the present invention.

Further suitable polyamines are: 1,14-diamino-4,11-dioxatetradecane; dipropylenetriamine; 2-methyl-1,5-pentanediamine; N,N'-dicyclohexyl-1,6-hexanediamine; N,N'-dimethyl-1,3-diaminopropane; N,N'-diethyl-1,3-diaminopropane; N,N-dimethyl-1,3-diaminopropane; secondary polyoxypropylenedi- and triamine; 2,5-diamino-2,5-dimethylhexane; bis-(amino-methyl)tricyclopentadiene; 1,8-Diamino-p-menthane; Bis-(4-amino-3,5-dimethylcyclohexyl)methane; 1,3-Bis(aminomethyl)cyclohexane (1,3-BAC); dipentylamine. N-2-(aminoethyl)piperazine (N-AEP); N-3-(aminopropyl)piperazine; piperazine.

Using mixtures from several of the mentioned amines is possible as well. Preferably used as component b1) is an amine selected from aliphatic, cycloaliphatic, araliphatic amines. Preferred amines are selected from MXDA, IPD, TMD, 1,2-DACH, 1,3-BAC, DETA and diaminodicyclohexylmethane (PACM) or any mixture thereof.

The already mentioned cyclic carbonates can be used not only in combination with epoxies, they can also be used for the preparation of amine adducts b1) further formulated with the epoxy compound to give a curable composition. These carbonates can be of various types: for example the reaction product of alkylene oxide compounds with carbon dioxide, or based on the reaction product of glycidyl compounds with carbon dioxide. Preferred compounds are monofunctional cyclic carbonates like $C_2$-$C_4$-alkylene carbonates.

The DCPD-phenol novolacs used in the instant invention as component b2) can be prepared according to well-known processes, e.g. by reacting phenolic compounds of general formula (I) below—such as phenol, methylphenol (cresol), dimethylphenol (xylenol), other alkylphenols types and the like—with a dicyclopentadiene of formula (II) below, using, if required, a catalyst like a boron trifluoride phenol complex or other catalysts of the state of the art. Thus an inventive DCPD-phenol based novolac is a product of the reaction of a phenolic compound of general formula (I) with dicyclopentadiene (II):

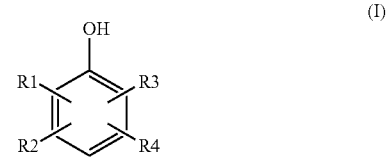

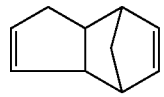
(II)

The novolacs derived from compounds of formula (I) are those, wherein in formula (I) $R_1$, $R_2$, $R_3$, $R_4$, independently of one another are H, branched or unbranched alkyl radicals containing 1 to 15 carbon atoms.

Preferred novolacs are those derived from the condensation of phenol and dicyclopentadiene.

The DCPD-phenol novolacs prepared are statistical compositions, with a well defined polydispersity index. In the present case the molecular weights are generally low with a narrow distribution and a polydispersity index of about Ip~1.1 to 1.2. Generally a narrow distribution of molecular weight with a polymer index approaching 1.0 (Ip~1.0) is preferred in order to reduce the viscosity of the final hardener blend b) as much as possible. The amine/DCPD-phenol novolac hybrid hardeners b) can for example be prepared by dissolving the novolac in the amine at approximately 90° C. under flow of nitrogen and under stirring for approximately half an hour.

The novolac, preferably derived from phenol and dicyclopentadiene should be present in an amount of 1 to 65% by weight (wt %), preferably between 5 and 65 wt %, most preferably between 10 and 65 wt % based on the total weight of the hardener blend comprising components b1) and b2) in order to get a liquid hardener composition at ambient conditions. In this respect, under ambient conditions is understood normal room temperature of 20+/−5° C.

Epoxy compounds a) and hybrid hardeners b) of the curable compositions are preferably used in about equivalent amounts, i.e. based on active hydrogen's bound to amino nitrogen atoms and reactive epoxy groups. However, it is also possible to use the hybrid hardener or the glycidyl component in more or less than the equivalent amount. The amounts used depend on the desired final properties of the reaction product as known by the skilled persons in the art.

The epoxy resin compositon can optionally further include other inorganic and/or organic additives selected for example from flow control additives, antifoaming agents, anti-sag agents, pigments, reinforcing agents, fillers, elastomers, stabilizers, extenders, plasticizers, flame retardants, accelerators, colorants, fibrous substances, thixotropic agents, anti-corrosive pigments and solvents.

As mentioned, accelerators in catalytic amounts for epoxy/amine reactions can be used in addition to the new amine/polyphenol hybrid hardeners. Suitable examples are for instance Mannich base type accelerators like Accelerators 2950 and 960-1 from Huntsman Advanced Materials, tertiary amines like benzyldimethylamine (BDMA), metal salts like hydroxides and nitrates most known those of group I and group II metals such as calcium, lithium etc. as described in EP 0 083 813 A1 and EP 0 471 988 A1, or acids like salicylic acid can be added as well. The amount of accelerator is from 0.1 to 10, preferably from 0.3 to 5, more preferably from 0.5 to 3 wt % based on the total weight of amine/novolac/accelerator.

Preferred accelerators are selected from salicylic acid, benzyldimethylamine, 2,4,6-tris(dimethylaminomethyl)phenol, calcium nitrate.

As already mentioned the present invention is concerned with new hardener blends based on amines and a special novolac based on dicyclopentadiene-phenol. It has surprisingly been observed that by blending for example diethylenediamine (DETA) with such special novolacs at a high concentration of above 25 wt % based on amine, said blends being used as part of a curable epoxy composition, coatings are achieved with improved resistance toward humidity and carbamation and with the effect of reduced stickiness and shorter dust free times, when compared to amine blends made with the same concentration of a conventional novolac based on phenol-formaldehyde.

A very preferred embodiment of this invention is the use of the amine DETA blended with a DCPD-phenol based novolac due to the observed outstanding corrosion resistance obtained with said blend. It was surprising to observe that the blending with such special novolac especially at high concentration of DCPD-phenol novolac above 40 wt % gives films, which are less sensitive towards humidity and carbamation resulting in a reduced stickiness and improved dust free times of below 24 hours at the low temperature of 5° C.

As already mentioned, when the concentration of DCPD-phenol novolac in the hardener blend becomes high, the formulated hardener blend amine/DCPD-phenol novolac in combination with epoxy exhibits rapid cure rate. This effect is of high interest for certain application areas like protective coatings, construction and adhesive materials. A specific application field, for instance, is marine, where the anti-corrosive coating is generally applied to freshly sand-blasted steel and should be preferably fully cured and being tacky-free after 24 h, even at temperatures as low as 0° C. Such novel class of amine/dicyclopentadiene-phenol novolac resin compositions offers, at high concentration of DCPD-phenol novolac, rapid cure and an improved resistance to corrosion compared to neat amine/epoxy systems.

Compared to hardeners like phenalkamines, which are as well suitable for low temperature cure, said inventive hybrid systems are much more rapid, and further ensures good corrosion resistance and good intercoat-adhesion. Moreover, the new hybrid hardeners are much less colored than phenalkamines used mainly for marine coatings for below water or above water area, ballast water tanks etc. and also other application fields where fast manufacture time is required. Accordingly further possible applications include e.g. refurbishment of existing tanks, pipelines etc., as those should return to service also in a short time. In practice, this means that the curing should be achieved within a couple of hours, typically within 2 to 5 hours, even at low temperatures, close to 0° C.

Furthermore, said new hybrid hardeners could, as well, be useful for applications in which corrosion or chemical protection is required, such as tank lining. The blending of the amines with such novolacs improve as well the chemical resistance especially at high concentrations of DCPD-phenol based novolacs above 40 wt % based on the amine blend.

In principle, the usable quantity of DCPD-phenol resin depends on the type of amine or mixture of amines as well on the type of phenolic resin used to prepare the hybrid hardener and on the targeted viscosity/properties for a given application. To that respect, the viscosity of the hybrid hardeners should be preferably lower than 20 000 mPa·s at ambient temperatures. Only in the case of high hardener blend viscosities or even semi-solid compositions having high dynamic shear viscosities, it is desirable to add a solvent to the hardener blend in order to reduce the viscosity of the final formulation to make the said formulation spray or brush applicable. Standard solvents, like xylene/butanol mixtures or pure alcohols like methoxypropanol are commonly used.

The inventive curable compositions can be cured at a temperature within the range of from −40° C., preferably from about −10° C., to about 150° C. for a sufficient time to fully cure the epoxy resin. For standard ambient cure applications, the composition is preferably cured at a temperature from about −5° C. to about 50° C.

A further object of the invention is a cured material, obtained from curing an inventive composition.

The inventive curable epoxy compositions and the cured materials obtained therefrom can be used in the field of coating, adhesion, flooring, casting, tooling or encapsulating, to name a few. The described advantages makes said compositions nevertheless especially useful for providing protective coatings and adhesives.

Furthermore, the unusually high reactivity of the inventive compositions at low tempartures (e.g. less than 0-25° C.), and the properties of the cured compositions, are also relevant for thermoset products which can be tailored for use with large composites. Conventional systems cannot be used for large structures/areas, as these would require e.g. special ovens for elevated temperatures curing. The compositions of the present invention are therefore also suitable for bonding of wind turbine blades, sandwich panel bonding, thixotropic modelling pastes for production of aero and auto parts.

The epoxy compositions have further particularly good applicability for coatings, especially when combined with pigments. The epoxy compositions using the novel hybrid hardeners described above can for example advantageously be combined with an anti-corrosive pigments like zinc phosphate or zinc powder to produce paint formulations having high corrosion resistance for marine and heavy duty applications. Furthermore the compositions can also include pigments like iron oxide and titanium dioxide and a filler like barium sulfate, to give protective coatings for tanks and pipes. The resulting formulations can be applied on at least one surface of the substrate to be coated in conventional manner by spraying, roller coating, brushing etc. or with special equipments like a twin-feed spray equipment and the like, depending on the gel time of the system.

A further object of the instant invention is the use of a hardener blend b) as a curing agent, whereby said hardener is a blend of b1) an aminic compound selected from aliphatic, cycloaliphatic, araliphatic amines, b1) an aminic compound selected from aliphatic, cycloaliphatic, araliphatic amines, imidazoline group-containing amidoamines based on mono- or polybasic acids, adducts of said amines or amidoamines made from glycidyl compounds, adducts of said amines or amidoamines made from cyclic carbonates, whereby said aminic compound contains, on average per molecule, at least two reactive hydrogen atoms bound to nitrogen atoms, and b2) a polymer DCPD-phenol based novolac, and wherein the DCPD-phenol novolac is used in an amount of from 1 to 65 wt %, based on the total weight of the hardener blend b1) and b2).

Suitable and preferred amines, cyclic carbonates and DCPD-phenol based novolacs which can be used for this object are identical to those mentioned before with regard to curable epoxy resin compositions. Further standard accelerators can be used in addition to the amine/DCPD-phenol based novolacs hardener blends. Suitable and preferred catalysts and appropriate amounts are those as already mentioned before.

EXAMPLES

The following novolacs were prepared according to well-known processes based on the alkylation product of DCPD and phenol based eg on the use of a Friedel-Crafts catalyst boron trifluoride (27% in phenol, from BASF) or an aqueous solution of fluoroboric acid ($HBF_4$):

Example 1

Synthesis of Novolac DCPD-phenol by Using as Catalyst a Boron Trifluoride Phenol Complex 780 g dehydrated phenol (freshly distilled or molten mass) was first mixed with 5.6 g boron trifluoride phenol complex catalyst (boronfluoride, 27% in phenol, BASF) at a temperature of 90° C. and 90 g dicyclopentadiene was added slowly under stirring/flow of nitrogen to the reaction mixture at this temperature within 1 h 30 min. After this time the reaction mixture was heated up to 140° C. and kept at this temperature for 3 hours. The catalyst was then deactivated with 1.8 g of an aqueous solution of 50 wt % of sodium hydroxide. The excess of phenol was removed by distillation and the formed polymer was purified by stream stripping to give 201.8 g of a polymer, which characteristics are given in table 1.

Example 2

Synthesis of Novolac DCPD-phenol Using as Catalyst $HBF_4$ 685 g dehydrated phenol (freshly distilled or molten mass) was first mixed with 3.4 g water and 7.5 g aqueous solution of 50% fluoroboric acid ($HBF_4$, Fluka) at a temperature of 95° C. and then 298 g dicyclopentadiene was added slowly under stirring/flow of nitrogen to the reaction mixture within 1 h 30 min at a temperature of 90° C. After this time the reaction mixture was heated up to 135° C. and kept at this temperature for 5 hours. The catalyst $HBF_4$ was then deactivated with 3.4 g of a 50 wt % aqueous solution of sodium hydroxide. The excess of phenol was removed by distillation and the formed polymer was purified with stream stripping to give 648.2 g of polymer, which characteristics are given in table 1.

TABLE 1

GPC characteristics of different synthezised DCPD-phenol novolacs

| Novolacs | DCPD-phenol Cat. = $BF_3$-phenol | DCPD-phenol Cat. = aq. 50% $HBF_4$ |
|---|---|---|
| $Mn^{1)}$ | 382 | 531 |
| $Mw^{1)}$ | 408 | 657 |
| $Ip^{1)}$ | 1.07 | 1.24 |
| $Tg\ (°\ C.)^{2)}$ | 64.1 | 76.7 |

[1] Mn and Mw determined using GPC-RI: Columns: 3 × Mixed-C; eluant: THF at 1 ml/min, Polystyrene calibration
[2] Glass transition temperature was determined by DSC at the inflection point ($1^{st}$ scan)
Cat. = Catalysator A) Cure Properties of Formulations Made with Hybrid Hardeners Based on Blends of Amine/DCPD-phenol Novolac—Comparison with Blends Amine/Phenol-formaldehyde Novolac The following hybrid hardeners were prepared by dissolving the DCPD-phenol novolac resin in the amine mixtures at a temperature of 80° C.; the characteristics of the hybrid hardeners are given below in table 2:

TABLE 2

Characteristics of hybrid hardeners with a ratio of 75:25 of amine:polyphenolic resin

| | Blend | | |
|---|---|---|---|
| | A | B | C |
| DETA[1] | 75 | 75 | 75 |
| Novolac DCPD-phenol of example 1 | 25 | — | — |
| Novolac DCPD-phenol of example 2 | — | 25 | — |
| Phenol novolac (Supraplast 3616)[2] | — | — | 25 |
| Viscosity of hardener at 25° C.[3] | <100 | <100 | <100 |

[1] DETA = diethylenetetramine;
[2] Novolac resin Supraplast 3616 purchased from Sud-West-Chemie GmbH Neu-Ulm with the following characteristics Mn = 341, Mw = 474, Ip = 1.39 determined by using GPC-RI; columns: 3 × Mixed-c; eluant: THF at 1 ml/min, Polystyrene calibration and it contains less than 0.8% free phenol;
[3] Viscosity of amine/novolac blend was determined at 25° C. using a CAP 2000 viscosimeter with cone 6 at 500 rpm (ISO 3219).

Table 3 below gives the cure properties of different epoxy systems comprising different blends of amine/novolac resin cured at both temperatures 0° C. and 5° C.

TABLE 3

Cure properties of the hybrid hardeners compared to upper limit of the compositions claimed in the application WO 99/29757, for instance at the ratio amine/novolac resin 75/25

| | Formulation | | |
|---|---|---|---|
| | 1 | 2 | 3 (Comp.) |
| Epoxy resin[1] | 87.15 | 87.15 | 87.15 |
| amine/novolac blend A)[2] | 12.85 | — | — |
| amine/novolac blend B)[2] | — | 12.85 | — |
| amine/novolac blend C)[2] | — | — | 12.85 |
| Viscosity of formulation at 25° C.[3] | 2100 | 2250 | 2400 |
| Full cure at 0° C. (hours)[4] | 13 | >24 | >24 |
| Dust free at 0° C. (hours)[5] | >24 | >24 | >24 |
| Full cure at 5° C. (hours)[4] | 8 | 8 | 7 |
| Dust free at 5° C. (hours)[5] | 11 | 14 | >24 |
| Full cure at 23° C. (hours)[4] | 2.5 | 2.5 | 2 |
| Dust free at 23° C. (hours)[5] | 2 | 6 | 10 |

Coating thickness measured on glass was between 250-300 μm.
[1] GY250 with epoxy equivalent weight of EEW 186 in wt %;
[2] in wt %;
[3] Viscosity of the formulation was determined at 25° C. using a CAP 2000 viscosimeter (ISO 3219) with cone 6 at 500 rpm for formulations 1, 2 and 3 and with cone 3 at 500 rpm for comparatives 1 and 2;
[4],[5] the cure times were measured on Landolt equipment using glass sheets coated with the above formulations. To determine the full cure, a needle is continuously moving forward on the coated glass during exactly 24 h; the full cure is determined by measuring the distance/time where the needle, penetrating the film, comes out from the film. To determine dust free time, sand is continuously added to the coating surface; the dust free time is measured by removing the sand from the coating surface and measuring the distance/time where sand sticks on the coating surface.

The results for the inventive compositions A and B, especially if compared with the comparative composition 3 (=Comp.) given in table 2, show better dust free times especially visible at 5° and 23° C.

The table 4 below gives the hardness in Persoz sec in function of the cure times at different cure temperatures and relative air humidity conditions for the inventive formulations 1, 2 and comparative formulation 3 as listed in table 3:

TABLE 4

Hardness in Persoz (Sec) values for some coatings in function of the cure time and under different relative air humidity conditions

| | Persoz hardness values[1] for formulation | | |
|---|---|---|---|
| | 1 | 2 | 3 |
| after 1 day (d) at 0° C. | 13 | 11 | sticky |
| 7 d at 0° C. | 46 | 67 | 22 |
| 14 d at 0° C. | 59 | 86 | 50 |
| after 1 day (d) at 5° C. | 28 | 28 | 35 |
| 7 d at 5° C. | 160 | 121 | 108 |
| 14 d at 5° C. | 215 | 198 | 177 |

[1] Persoz hardness was measured using a 250-300 um coated glass plates

The results of table 4 show that both DCPD-phenol novolacs improve slightly the hardness built-up of the coatings, especially visible at the lower temperature 0° C., the surface of the coating being sticky and not measurable for formulation 3 (comparative example comprising the phenol novolac supraplast 3616).

B) Cure Properties of Hybrid Hardeners DETA with Higher Amounts of DCPD-phenol Novolac Blends of DCPD-phenol based novolac/DETA were prepared close to the upper limit of concentration of DCPD-novolac as claimed for the present invention, which was about 60 wt % and compared with a blend comprising the same concentration of standard phenol-formaldehyde novolac supraplast 3616 from Süd-West Chemie (table 5). It seems that only the hardeners D and E based on DCPD-phenol have viscosities lower than 20 000 mPa·s, the hardener F based on formaldehyde-phenol novolac exhibits a much higher viscosity of above 150 000 mPa·s.

TABLE 5

Hybrid hardener with a ratio in wt % of DETA:polyphenolic resin of 40:60

| | Blend | | |
|---|---|---|---|
| | D | E | F |
| DETA[1] | 40 | 40 | 40 |
| novolac DCPD-phenol of example 1[1] | 60 | — | — |
| novolac DCPD-phenol of example 2[1] | — | 60 | — |
| phenol novolac (Supraplast 3616)[1] | — | — | 60 |
| Viscosity hardener at 25° C.[2] | 17700 | 11750 | >150000 |

[1] In wt %;
[2] Viscosity of amine/novolac blend was determined at 25° C. using a CAP 2000 viscosimeter with cone 6 at 500 rpm (ISO 3219).

As can be seen the quantity of phenolic resin depends principally on the type of amine or mixture of amines as well on the type of phenolic resin used to prepare the hybrid hardener and on the targeted viscosity/properties for a given application. Usually it is desirable to have hardeners with viscosities as low as possible to be compliant with the environmental legislation on VOC's. Therefore we compared the properties of hardeners with lower viscosities, for instance around 4000 mPa·s and which compositions are listed in table 6 and properties are given in table 7.

TABLE 6

Hybrid hardeners with different ratio of DETA:polyphenolic resin and viscosities around 4000-5000 mPa·s

| | Blend | | |
|---|---|---|---|
| | G | H | I |
| DETA[1] | 45 | 45 | 50 |
| novolac DCPD-phenol of example 1[1] | 55 | — | — |
| novolac DCPD-phenol of example 2[1] | — | 55 | — |
| phenol novolac (Supraplast 3616)[1] | — | — | 50 |
| Viscosity hardener at 25° C.[2] | 4200 | 3750 | 4970 |

[1]In wt %;

[2]Viscosity of amine/novolac blend was determined at 25° C. using a CAP 2000 viscosimeter with cone 6 at 500 rpm (ISO 3219).

TABLE 7

Cure properties of the hybrid amine/DCPD-phenol novolac hardeners compared to amine/phenol formaldehyde novolac hardener:

| | Formulation | | |
|---|---|---|---|
| | 4 | 5 | 6 |
| Epoxy resin[1] | 80.26 | 80.26 | 81.88 |
| amine/novolac blend G)[2] | 19.74 | — | — |
| amine/novolac blend H)[2] | — | 19.74 | — |
| amine/novolac blend I)[2] | — | — | 18.12 |
| Viscosity of formulation at 25° C.[3] | 8000 | 8150 | 11500 |
| Full cure at 0° C. (hours)[4] | 5 | 7 | 6 |
| Dust free at 0° C. (hours)[5] | 9 | 16 | >24 |
| Full cure at 5° C. (hours)[4] | 4 | 5 | 3.5 |
| Dust free at 5° C. (hours)[5] | 4 | 4.5 | 6 |
| Full cure at 23° C. (hours)[4] | 2 | 2 | 1 |
| Dust free at 23° C. (hours)[5] | 2 | 2 | 4 |

[1]GY 250 with Epoxy equivalent weight of EEW 186 in wt %;

[2]in wt %;

[3]Viscosity of the formulation was determined at 25° C. using a CAP 2000 viscosimeter (ISO 3219) with cone 6 at 500 rpm;

[5,6]the cure times full cure and dust free were measured on Landolt equipment using glass sheets coated with the above formulations (see described method before). Coating thickness measured on glass was between 250-300 μm.

As can be seen the dust free time is improved for the DCPD-phenol novolac hybrid hardener compared to the phenol-formaldehyde novolac hybrid hardener. Even at 23° C., the hardener blend I with the supraplast show some exudation and stickiness compared to the DCPD-phenol hybrid hardeners.

C) Chemical Resistance of Hybrid Hardener Blends Combined with Epoxy Resin

The chemical resistance was tested on-coatings applied approximately 500 microns thick on sand-blasted steel panels Sa $2^{1/2}$, which were cured for 10 days at 23° C. and 50% rh. The chemical resistances of the inventive hybrid hardener blends DETA/DCPD-phenol was compared to those of unmodified amines, for instance DETA, and also to those of DETA/phenol-formaldehyde novolac hybrids which ratio was taken at the upper limit of the compositions claimed in the application WO 99/29757, for instance the ratio amine/phenol-formaldehyde novolac 75:25 (see also blend C above).

First the results for the chemical resistance of unmodified amine DETA are given in table 8.

TABLE 8

Chemical resistance of the neat system DETA/Araldite GY250 (unmodified system)

| Epoxid/ | Araldite GY250: | | | | | | | | 90.04 parts/ | | | | | |
|---|---|---|---|---|---|---|---|---|---|---|---|---|---|---|
| Hardener | DETA: | | | | | | | | 9.96 parts | | | | | |
| Duration (d, w, m)[1] | 3 d | 1 w | 2 w | 1 m | 2 m | 3 m | 4 m | 5 m | 6 m | 7 m | 8 m | 9 m | 10 m | 11 m | 12 m |
| HCl 20 wt % | ■ | ■ | ■ | ■ | ■ | ■ | ■ | ■ | ■ | ■ | ■ | ■ | ■ | ■ | ■ |
| HCl conc. | ■ | ■ | ■ | ■ | ■ | ■ | ■ | ■ | ■ | ■ | ■ | ■ | ■ | ■ | ■ |
| $H_2SO_4$ 50 wt % | ■ | ■ | ■ | ■ | ■ | ■ | ■ | ■ | ■ | ■ | ■ | ■ | ■ | ■ | ■ |
| $NH_4OH$ conc. | ■ | ■ | ■ | ■ | ■ | ■ | ■ | ■ | ■ | ■ | ■ | ■ | ■ | ■ | ■ |
| $C_6H_4(CH_3)_2$ | ■ | ■ | ■ | ■ | ■ | ■ | ■ | ■ | ■ | ■ | ■ | ■ | ■ | ■ | ■ |
| $C_2H_5OH$ 95 wt % | ■ | ■ | ■ | ■ | ■ | ■ | ■ | ■ | ■ | ■ | ■ | ■ | ■ | ■ | ■ |
| $C_2H_5OH$ 50 wt % | ■ | ■ | ■ | ■ | ■ | ■ | ■ | ■ | ■ | ■ | ■ | ■ | ■ | ■ | ■ |
| $CH_3COOH$ 10 wt % | □ | □ | □ | □ | □ | □ | □ | □ | □ | □ | □ | □ | □ | □ | □ |
| $CH_3COOH$ 5 wt % | □ | □ | □ | □ | □ | □ | □ | □ | □ | □ | □ | □ | □ | □ | □ |

For tables 8 to 10:
■=resistant to, ▌F=finally attacked rough surface, ▌=attacked by, or ☐ =destroyed by the chemical The chemical resistance of coatings made with the above amines containing Supraplast 3616 of about 25 wt % (blend C), the upper limit that is mentioned in the application WO 99/29757, is given in table 9. The chemical resistance is improved when compared with the neat system DETA, but the coatings are rough (slightly attacked) after 3 days in the case of the very aggressive chemical of an aqueous solution of 10 wt % acetic acid.

TABLE 9

Chemical resistance of DETA containing 25 wt % novolac resin Supraplast 3616 (blend C)

| Epoxid/<br>Hardener | Araldite GY250:<br>DETA/supraplast 3616 [75/25]: | | | | | | | | 87.15 parts/<br>12.85 parts | | | | | |
|---|---|---|---|---|---|---|---|---|---|---|---|---|---|---|
| Duration (d, w, m)¹⁾ | 3 d | 1 w | 2 w | 1 m | 2 m | 3 m | 4 m | 5 m | 6 m | 7 m | 8 m | 9 m | 10 m | 11 m | 12 m |
| HCl 20 wt % | ■ | ■ | ■ | ■ | ■ | ■ | ■ | ■ | ■ | ■ | ■ | ■ | ■ | ■ | ■ |
| HCl conc. | ■ | ■ | ■ | ■ | ■ | ■ | ■ | ■ | ■ | ■ | ■ | ■ | ■ | ■ | ■ |
| H₂SO₄ 50 wt % | ■ | ■ | ■ | ■ | ■ | ■ | ■ | ■ | ■ | ■ | ■ | ■ | ■ | ■ | ■ |
| NH₄OH conc. | ■ | ■ | ■ | ■ | ■ | ■ | ■ | ■ | ■ | ■ | ■ | ■ | ■ | ■ | ■ |
| C₆H₄(CH₃)₂ | ■ | ■ | ■ | ■ | ■ | ■ | ■ | ■ | ■ | ■ | ■ | ■ | ■ | ■ | ■ |
| C₂H₅OH 95 wt % | ■ | ■ | ■ | ■ | ■ | ■ | ■ | ■ | ■ | ■ | ■ | ■ | ■ | ■ | ■ |
| C₂H₅OH 50 wt % | ■ | ■ | ■ | ■ | ■ | ■ | ■ | ■ | ■ | ■ | ■ | ■ | ■ | ■ | ■ |
| CH₃COOH 10 wt % | ▌F | ▌F | ▌ | ▌ | ▌ | ▌ | ▌ | ☐ | ☐ | ☐ | ☐ | ☐ | ☐ | ☐ | ☐ |
| CH₃COOH 5 wt % | ■ | ■ | ■ | ■ | ■ | ■ | ■ | ■ | ■ | ■ | ■ | ■ | ■ | ■ | ■ |

The chemical resistance values of the inventive hybrid compositions containing high amounts of DCPD-phenol novolac of about 55 wt % (blend G) are given below in table 10.

TABLE 10

Chemical resistance of DETA containing 55 wt % of DCPD-phenol novolac resin (blend G)

| Epoxid/<br>Hardener | Araldite GY250:<br>DETA/DCPD-phenol 45/55 | | | | | | | | 80.26 p/<br>19.74 p | | | | | |
|---|---|---|---|---|---|---|---|---|---|---|---|---|---|---|
| Duration (d, w, m)¹⁾ | 3 d | 1 w | 2 w | 1 m | 2 m | 3 m | 4 m | 5 m | 6 m | 7 m | 8 m | 8 m | 10 m | 11 m | 12 m |
| HCl 20 wt % | ■ | ■ | ■ | ■ | ■ | ■ | ■ | ■ | ■ | ■ | ■ | ■ | ■ | ■ | ■ |
| HCl conc. | ■ | ■ | ■ | ■ | ■ | ■ | ■ | ■ | ■ | ■ | ■ | ■ | ■ | ■ | ■ |
| H₂SO₄ 50 wt % | ■ | ■ | ■ | ■ | ■ | ■ | ■ | ■ | ■ | ■ | ■ | ■ | ■ | ■ | ■ |
| NH₄OH conc. | ■ | ■ | ■ | ■ | ■ | ■ | ■ | ■ | ■ | ■ | ■ | ■ | ■ | ■ | ■ |
| C₆H₄(CH₃)₂ | ■ | ■ | ■ | ■ | ■ | ■ | ■ | ■ | ■ | ■ | ■ | ■ | ■ | ■ | ■ |
| C₂H₅OH 95 wt % | ■ | ■ | ■ | ■ | ■ | ■ | ■ | ■ | ■ | ■ | ■ | ■ | ■ | ■ | ■ |
| C₂H₅OH 50 wt % | ■ | ■ | ■ | ■ | ■ | ■ | ■ | ■ | ■ | ■ | ■ | ■ | ■ | ■ | ■ |
| CH₃COOH 10 wt % | ■ | ■ | ■ | ■ | ■ | ■ | ■ | ▌ | ☐ | ☐ | ☐ | ☐ | ☐ | ☐ | ☐ |
| CH₃COOH 5 wt % | ■ | ■ | ■ | ■ | ■ | ■ | ■ | ■ | ■ | ■ | ■ | ■ | ■ | ■ | ■ |

The invention claimed is:

1. A curable composition comprising:
   a) an epoxy resin containing on average more than one epoxy group per molecule and a cyclic carbonate, and
   b) as curing agent a hybrid hardener, whereby said hardener is a blend of
      b1) an aminic compound selected from aliphatic, cycloaliphatic, araliphatic amines, imidazoline group-containing amidoamines based on mono- or polybasic acids, adducts of said amines or amidoamines made from glycidyl compounds, whereby said aminic compound contains, on average per molecule, at least two reactive hydrogen atoms bound to nitrogen atoms, and
      b2) a DCPD-phenol based novolac,
   and wherein the DCPD-phenol novolac is used in an amount from 1 to 65 wt %, based on the total weight of the hardener blend b1) and b2).

2. A composition according to claim 1, wherein the DCPD-phenol based novolac is a product of the reaction of a phenolic compound of general formula (I) with dicyclopentadiene (II):

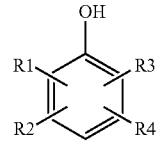
(I)

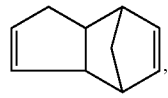
(II)

wherein in formula (I) $R_1$, $R_2$, $R_3$, $R_4$, independently of one another are H, or branched or unbranched alkyl radicals containing 1 to 15 carbon atoms.

3. A composition according to claim 1, wherein as component b1) is used an amine selected from aliphatic, cycloaliphatic and araliphatic amines.

4. A composition according to claim 3, wherein the amine is selected from m-xylylenediamine, isophoronediamine, trimethylhexamethylenediamine 1,2-diaminocyclohexane, 1,3-bis(aminomethyl)cyclohexane, diethylenetriamine, and diaminodicyclohexylmethane.

5. A composition according to claim 1, wherein the cyclic carbonate is selected from ethylene carbonate, 1,2-propylene carbonate and 1,2-butylenecarbonate.

6. A composition according to claim 1, wherein the epoxy resin of component a) is selected from diglycidylether of bisphenol A, diglycidylether of bisphenol F, polyglycidylether of polyhydric phenol or cresol novolacs, polyglycidylether of polyhydric cycloaliphatic alcohols, and polyglycidylether of polyhydric aliphatic alcohols.

7. A composition according to claim 1, wherein component a) further comprises a reactive diluent.

8. A composition according to claim 1, which in addition comprises inorganic and/or organic additives selected from flow control additives, antifoaming agents, anti-sag agents, pigments, reinforcing agents, fillers, elastomers, stabilizers, extenders, plasticizers, flame retardants, accelerators, colorants, fibrous substances, thixotropic agents, anti-corrosive pigments and solvents.

9. A composition according to claim 8, wherein the accelerator is selected from salicylic acid, benzyldimethylamine, 2,4,6-tris(dimethylaminomethyl)phenol, and calcium nitrate.

10. A process for producing a cured material comprising selecting a curable composition according to claim 1 and exposing the curable composition to a temperature within the range of about −40° C. to about 150° C. to form the cured material.

11. A cured material produced according to the process of claim 10.

* * * * *